Patented Jan. 20, 1942

UNITED STATES PATENT OFFICE 2,270,607

CERAMIC CUTTING TOOL

Eugen Ryschkewitsch, Frankfort-on-the-Main, Germany, assignor, by mesne assignments, to Chemical Marketing Company Inc., New York, N. Y.

No Drawing. Application March 22, 1939, Serial No. 263,576. In Germany March 30, 1938

1 Claim. (Cl. 51—309)

It is known that cutting tools, such as rotating tools, cutters, planes, drills and so on which generally are made of steel, have certain disadvantages. For instance, they are not suited for the tooling of certain substances, such as very tough, and also substances which are tough and at the same time hard. Further disadvantages lie in the fact that the cutting steels easily become very hot during the tooling and thereby tend to lose their efficiency prematurely.

The principal object of my invention is the manufacture of cutting tools of the above mentioned type, especially such which are suited for special purposes, as for instance, the treatment of artificial resins, from substances which do not show the above mentioned disadvantages of the steels.

Thorough investigations have proved that it is possible to make cutting tools with excellent qualities, especially high border strength, from ceramic material.

As initial substances preferably highly refractory hard metallic oxides, such as aluminium oxide, zirconium oxide, beryllium oxide, thorium oxide and the like may be used, either alone or in mixture. The cutting tools may be manufactured in well known manner from these initial substances in the simplest way by converting the pulverulent raw material into forms of desired shape and afterwards stiffening them by sintering processes.

Instead of metal oxides of the above mentioned kind also mixtures thereof with well known hard substances may be used. As such hard substances mention is made of carbides, borides, silicides, nitrides and the like of tungsten, iron, carbon and the like, such as tungsten carbide, silicium carbide, iron nitride, boron nitride and the like, either alone or in mixture.

Hard substances, such as carbides, borides, silicides, nitrides are not fitted for the manufacture of suitable cutting tools alone, being not sufficiently plastic to be sintered. In mixture with highly refractory oxides, such as aluminium oxide and the like, however, they are excellently suited. In such mixtures the relatively plastic and sinterable metal oxides perform the function of a binder for the hard substances, which make it possible only by simple sintering processes to convert the forms made from the initial substances into solid homogeneous articles of great hardness and solidity, and having especially high border strength. The ratio of the quantities between the metal oxides and the hard substances therefore has to be chosen in such a way that the metal oxide present, for instance, aluminium oxide or the metal oxides present, are sufficient to bring about the necessary intimate binding. Usually at least 10 percent of metal oxides, preferably 20 percent and more, are necessary for this purpose.

Although it is possible to attain the scope of the invention in an excellent manner with highly refractory metal oxides alone, as, for instance, with aluminium oxide or mixtures of, for instance, aluminium oxide and chromium oxide, there also exists the possibility of using mixtures which principally are made from metal oxides but with a further addition of hard substances, such as carbides or the like.

Instead of, or besides, the hard substances of the above mentioned kind other substances of great hardness possessing at the same time sufficient stability may be used, such as for instance, diamond powder, crystallic boron, metallic chromium and the like, either alone or in mixture.

Generally it has been proved advantageous to use the initial substances, especially the highly refractory oxides in a form which is substantially free from disturbing components and impurities, as certain impurities, for instance, those which may act as fluxes, may influence the qualities of the manufactured cutting tools in an unfavourable manner. Furthermore, it has been proved advantageous first to melt the oxides, to crush the melt after solidification to the desired grade of fineness and then treat the crushed products subsequently.

Instead of metal oxides, compounds may be used which are capable of conversion into the desired oxides when the mixtures are heated. As examples, mention is made of the hydrates, formiates, acetates, and eventually the carbonates, and so on.

The manufacture of the forms may be carried out in the same or in a similar manner as in the manufacture of china ware, for instance, by preparing an aqueous suspension of the initial substances, then casting it into porous forms and treating the castings subsequently. Furthermore, the pulverulent slightly moistened initial substance may be converted into ropes by means of dry presses, plodders or the like, and afterwards cut into the desired articles, such as cutters or the like. The moulding of the initial substances may be favoured by known auxiliary means, as for instance, hydrochloric acid. Generally it has been proved advantageous to abstain from the use of special binding means or to use as binders only those which do not give residues like gelatine, starch, liquid sulfite cellulose wastes, gum arabic. The bodies thus formed may be improved by subsequent working. One may proceed also in such a way that the formed pieces are subjected to a certain solidification by preburning, afterwards treated subsequently, for instance, by producing perfect borders by polishing, and then subjecting the articles to the final sintering.

The formed bodies may be subjected to sintering after the casting. It has been found advantageous in the presence of hard substances to carry out the burning in an atmosphere which does not influence the articles unfavourably, preferably in an atmosphere free of oxygen. The reheating may be done either in vacuo or in an atmosphere of nitrogen or carbonmonoxide or also in an atmosphere of hydrogen. Usually it has been proved advantageous to carry out the burning at temperatures above 1600° centigrade, for instance, about 1700° to 2000° centigrade.

It is important that the manufacture of the cutting tools be carried out under conditions which result in articles having a finely crystalline structure. This must be considered carefully when controlling the sintering procedure. On the one hand the height of temperature and duration of the sintering procedure have to be rated in such a way that a uniform inter-sintering takes place, whilst on the other hand the burning procedure should not be extended unnecessarily since if it is dangerous recrystallisations with the formation of a coarse crystalline structure may occur.

The cutting tools according to my invention are especially suitable for purposes which may not properly be effected with steel tools. For instance, the treatment of tough substances, and also substances which are tough and at the same time hard such as artificial resins may be effected by my invention but not with steel tools. Furthermore, marble, glass, stones, artificial stones, concrete, wood and so on may be effectively cut by tools made in accordance with my invention.

Now it has been found that when using the cutting tools according to my invention the increase of temperature of the tools is less than when steel tools are used. But even if the tools according to my invention once become rather hot in special cases, their effect will not be reduced.

It has been known to make tools, such as drawing stones and the like, out of hard substances such as carbides, silicides and the like or out of highly refractory hard metal oxides, such as aluminium oxide and the like. But this does not involve the ratio of my aforementioned invention as it could not be foreseen that articles according to my invention are specially suited for the special purposes mentioned herein and that they would possess considerable advantages over the steel tools.

What I claim is:

A cutting tool consisting of a molded self-bonded sintered highly refractory aluminum oxide of high purity and a chromium oxide, the body of said cutting tool having a fine crystalline structure throughout.

EUGEN RYSCHKEWITSCH.